Aug. 7, 1928.
G. H. LOBER
1,679,674
WINDSHIELD WIPER OPERATING MECHANISM
Filed June 15, 1925
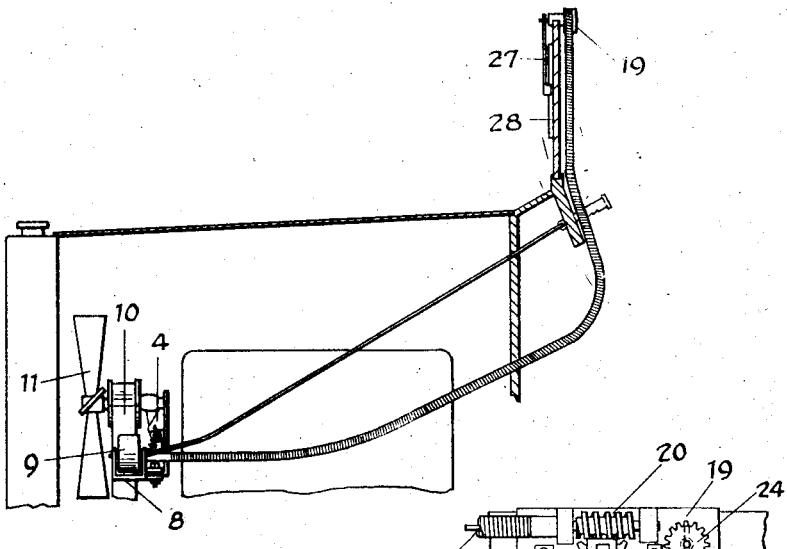
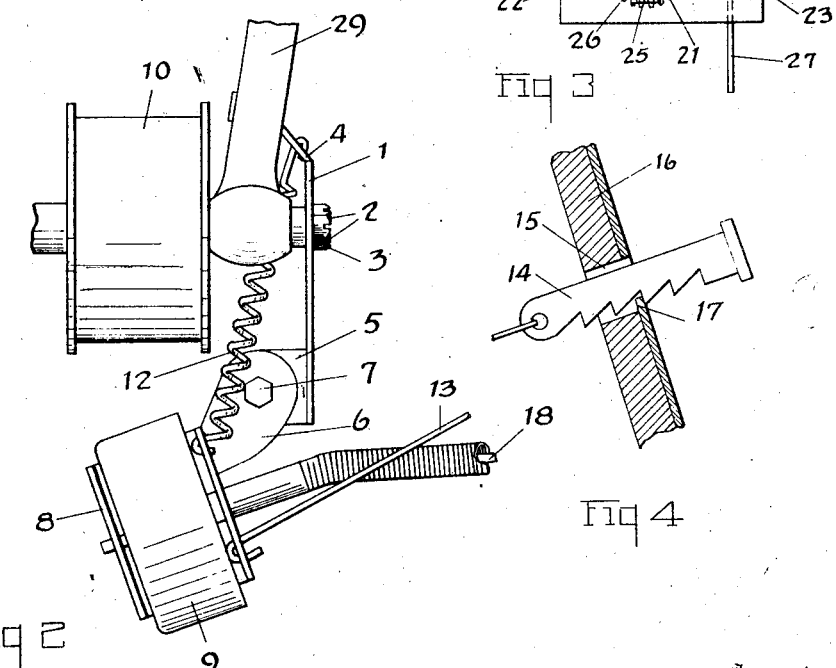

Patented Aug. 7, 1928.

1,679,674

UNITED STATES PATENT OFFICE.

GEORGE H. LOBER, OF TOLEDO, OHIO, ASSIGNOR TO THE BECK-FROST CORPORATION, OF DETROIT, MICHIGAN, A CORPORATION OF MICHIGAN.

WINDSHIELD-WIPER-OPERATING MECHANISM.

Application filed June 15, 1925. Serial No. 37,382.

My invention has for its object to provide a simple and efficient means for producing oscillatory movements in a windshield wiper of the type commonly used for removing water and snow from an area from the front of automobile windshields and to maintain the vision through that part of the windshield. The invention utilizes a means for operating the wiper that is mechanically connected with a belt driven by the engine. In the preferred form of the invention the means is attached to the supporting arm of the fan and a rotatable spool is bracketed for removably contacting with the fan belt and is connected to the wiper through a translating mechanism for changing the continuously rotatory movements of the spool into the required oscillatory movements of the wiper.

A structure containing my invention is shown in the accompanying drawings. The construction shown is selected as an example of different structures embodying my invention. The structure selected is described hereinafter.

Figure 1 of the drawings illustrates a side view of the device and illustrates somewhat diagrammatically the relative location of parts of the device to the parts of an automobile. Fig. 2 is a top view of the device. Fig. 3 illustrates a translating mechanism that may be used for changing rotatory movements into oscillatory movements. Fig. 4 illustrates a controlling means which is operated when it is desired to cause the operations of the wiper or to discontinue its operation.

In the form of construction shown in the drawing, a bracket is provided that may be readily suspended from the upper end of the fan adjusting arm of the type commonly used in Ford automobiles. The bracket or supporting member may be secured by merely placing the upper end of the bracket or member 1 over the end of the fan bearing bolt 2 and securing the bracket thereto by means of the nut 3. The bracket or member 1 may be further secured in a proper operative position by a flange 4 that protrudes from the supporting member 1 and engages the body or central portion of the arm, the center of gravity of the member and the parts supported thereon, being considerably to one side of a vertical line that passes through the center of the bearing bolt or pin 2. The supporting member 1 has an ear 5 and a bracket 6 that is pivotally connected to the ear 5 by means of the bolt 7 and consequently the bracket 6 is pivotally supported on the member. A channel member 8 may be integrally formed with the bracket 6 or attached to the bracket 6 and a spool or wheel 9 is pivotally supported in the channel member 8. The location of the pin 7 and the length of the bracket 6, that is, the distance from the center of the pin 7 to the center of the wheel or spool 9, is such that when the bracket 6 is rotated on the bolt 7, the surface of the spool 9 will make good contact with the belt 10, which drives the fan 11 of the engine in the manner well known in the art. A spring 12 is connected to the bracket 6 and to the protruding flange 4 to elastically draw the spool 9 against the belt 10 to cause the spool 9 to rotate. A wire 13 is connected to the bracket 6 and to a ratchet 14 that is located in an opening 15 formed in the instrument board 16. The teeth of the ratchet 14 are so positioned as to engage on an edge 17 of the metal commonly used for covering the instrument board and located in front of the opening 15 formed in the instrument board. Thus adjustment may be made of the relative position of the bracket 6 and the spool 9 when it is drawn from the belt 10.

The spool 9 is connected by a flexible shaft 18 of the type well known, to a translating mechanism 19 to convert rotative movements of the spool 9 into oscillatory movements. In the mechanism shown in Fig. 3 the flexible shaft 18 is connected to a worm 20 which operates on a worm wheel 21. A slotted bar 22 is supported for reciprocatory movements and is provided with a rack 23 that operates on a pinion 24. The slotted bar 22 is connected with the worm gear wheel 21 by means of a pin 25 that is located in the slot 26 formed in the bar 22, and the wiper arm 27 is connected to the pinion 24.

When, therefore, it is desired to cause the operation of the wiper 28, the ratchet 14 is released and the spring 12 operates to pull the ratchet 14 through the opening 15 and the spool 9 against the belt 10 which will cause the spool 9 to rotate and the wiper 28 to oscillate. When it is desired to discontinue the operation of the wiper, the ratchet 14 is again drawn through the opening 15 to the desired position and one of its teeth is allowed to engage to hold it in position. This draws the spool 9 away from the belt 10 and the wiper 28 ceases in its operation.

I claim:

1. In a mechanism for operating a windshield wiper, a bracket connected to the fan supporting arm of an automobile and located at a point below the fan belt pulley, the bracket extending laterally beside the edge of the fan belt, an arm supported for horizontal pivotal movements on the bracket, a spool rotatably supported on the pivoted arm and located in position to make peripheral contact with the pulley belt below the belt pulley, a spring extending horizontally across the bracket to the pivoted arm and connected to a fixed point and to the arm and bodily movable across the pivot of the arm for elastically pressing the spool against the fan belt and for holding the spool away from the fan belt, and means for pivotally moving the arm to cause the spring to pass over the pivot point of the arm.

2. In a mechanism for operating a windshield wiper, a bracket connected to the fan or supporting arm of an automobile and extending to a point below the fan belt pulley, an arm pivotally supported for horizontal movements on the bracket, a spool rotatably supported on the pivoted arm and located below the fan belt pulley, a spring extending horizontally from the bracket to the pivoted arm and interconnecting the bracket and the arm for elastically pressing the spool against the fan belt at a point below the fan belt pulley, a wire connected to the pivoted arm for moving the arm on its pivot, a ratchet member connected to the wire and extending through the instrument board of the automobile, the instrument board having means for engaging any one of the teeth of the ratchet whereby the spool may be pulled from the belt against the tension of the spring and secured in position by the engagement of one of the teeth of the ratchet member.

3. In a mechanism for operating the windshield wiper, a bracket connected to the fan supporting arm of an automobile, and extending to a point below the fan belt pulley, an arm pivotally supported on the bracket, a spool rotatably supported on the pivoted arm and located well below the fan belt pulley, a spring extending from the bracket to the pivoted arm and interconnecting the bracket and the pivoted arm for elastically pressing the spool against the fan belt at a point below the fan belt pulley, a wire connected to the pivoted arm for moving the arm on its pivot, and means for securing the wire and the arm in a position to which they may be moved.

In testimony whereof I have hereunto signed my name to this specification.

GEORGE H. LOBER.